United States Patent
Guha et al.

(10) Patent No.: US 11,665,580 B2
(45) Date of Patent: *May 30, 2023

(54) SYSTEMS AND METHODS FOR TUNING OF DYNAMIC SPECTRUM SHARING IN NETWORKS

(71) Applicant: Verizon Patent and Licensing Inc., Basking Ridge, NJ (US)

(72) Inventors: Ratul Kumar Guha, Warwick, PA (US); Kalyani Bogineni, Irving, TX (US); Lori E. Fountain, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/302,002

(22) Filed: Apr. 21, 2021

(65) Prior Publication Data

US 2021/0266782 A1    Aug. 26, 2021

Related U.S. Application Data

(63) Continuation of application No. 16/683,670, filed on Nov. 14, 2019, now Pat. No. 10,993,140.

(51) Int. Cl.
*H04W 28/02* (2009.01)
*H04W 28/24* (2009.01)
*H04W 24/08* (2009.01)
*H04W 76/11* (2018.01)
*H04W 16/04* (2009.01)
*H04L 47/80* (2022.01)
*H04L 47/32* (2022.01)
(Continued)

(52) U.S. Cl.
CPC ......... *H04W 28/0268* (2013.01); *H04L 47/32* (2013.01); *H04L 47/805* (2013.01); *H04W 16/04* (2013.01); *H04W 24/08* (2013.01); *H04W 24/10* (2013.01); *H04W 28/0236* (2013.01); *H04W 28/24* (2013.01); *H04W 72/542* (2023.01); *H04W 76/11* (2018.02)

(58) Field of Classification Search
CPC . H04W 28/0268; H04W 16/04; H04W 24/08; H04W 24/10; H04W 28/0236; H04W 28/24; H04W 72/542; H04W 76/11; H04W 24/02; H04W 88/10; H04W 16/14; H04L 47/32; H04L 47/805
See application file for complete search history.

(56) References Cited

U.S. PATENT DOCUMENTS

2016/0156548 A1\* 6/2016 Pazhyannur .......... H04L 45/245
370/338
2020/0351959 A1\* 11/2020 Lee ..................... H04W 72/543

\* cited by examiner

*Primary Examiner* — Ayanah S George

(57) ABSTRACT

A device of a RAN may receive first traffic associated with a first network type service, second traffic associated with a second network type service, and core network data associated with a core network that provides the first network type service and the second network type service. The device may calculate a per QCI split based on the core network data, and may calculate an initial resource split based on the per QCI split. The device may provide, to a first device, data identifying the initial resource split, and may receive a traffic bias per QCI based on providing the data identifying the initial resource split. The device may calculate a final resource split for the first traffic and the second traffic based on the traffic bias per QCI, and may cause the final resource split to be implemented via resources associated with the RAN.

20 Claims, 9 Drawing Sheets

(51) Int. Cl.
*H04W 24/10* (2009.01)
*H04W 72/542* (2023.01)

SYSTEMS AND METHODS FOR TUNING OF DYNAMIC SPECTRUM SHARING IN NETWORKS

RELATED APPLICATION

This application is a continuation of U.S. patent application Ser. No. 16/683,670, entitled "SYSTEMS AND METHODS FOR CLOSED LOOPED TUNING OF DYNAMIC SPECTRUM SHARING IN NETWORKS," filed Nov. 14, 2019 (now U.S. Pat. No. 10,993,140), which is incorporated herein by reference.

BACKGROUND

Dynamic spectrum sharing in a radio access network (RAN) (e.g., via an eNodeB (eNB) and a gNodeB (gNB)) enables use of a same block of spectrum for fourth generation (4G) resources and fifth generation (5G) resources. For example, dynamic spectrum sharing allows operators to dynamically allocate some existing 4G long term evolution (LTE) spectrum to 5G resources and to use existing radios (e.g., as long as they are 5G New Radio (NR)-capable) to deliver 5G services by deploying a software upgrade.

DETAILED DESCRIPTION OF PREFERRED EMBODIMENTS

Figure 1A:
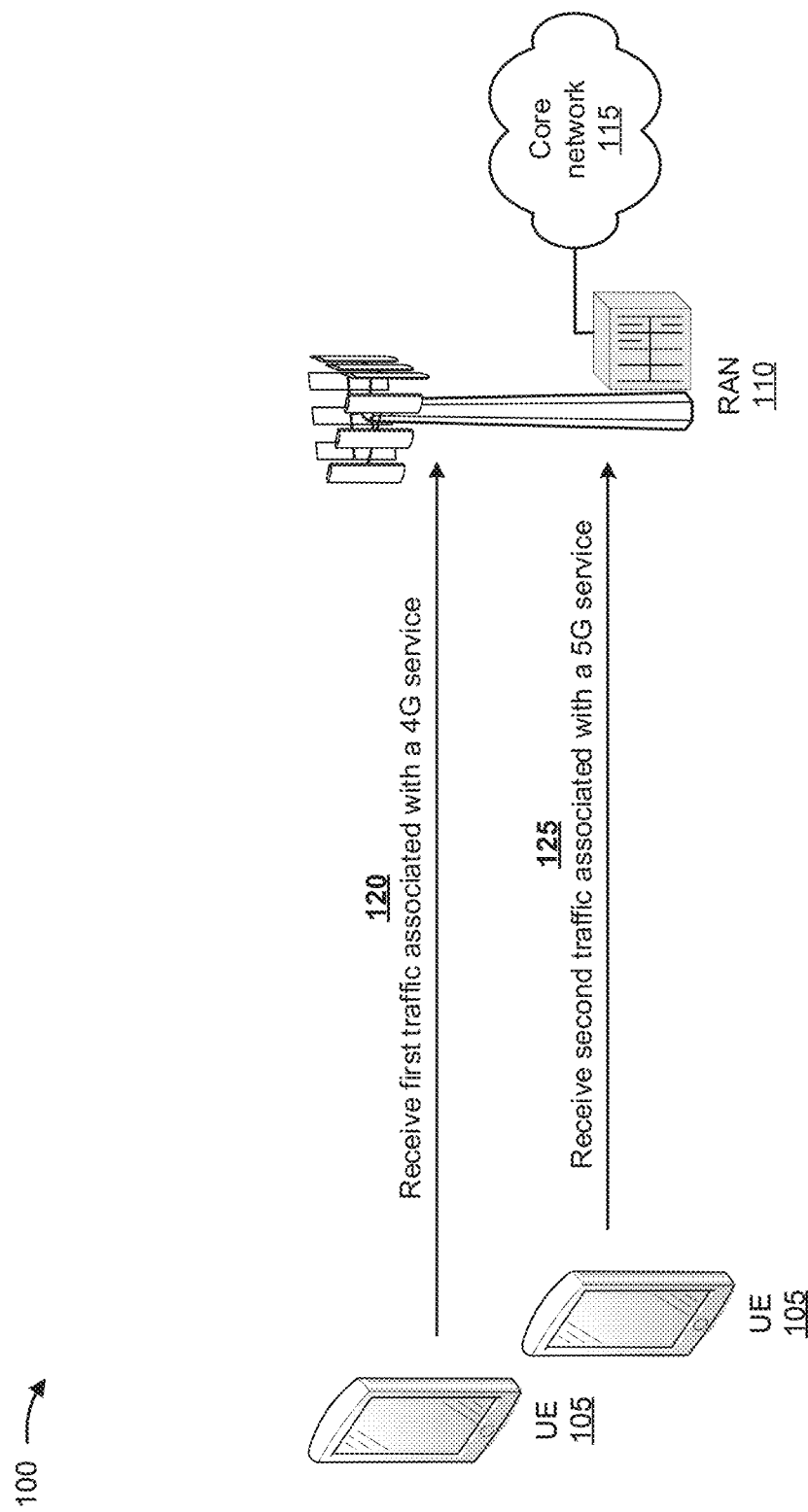
FIGS. 1A-1F are diagrams of one or more example implementations described herein.

The following detailed description of example implementations refers to the accompanying drawings. The same reference numbers in different drawings may identify the same or similar elements.

In existing techniques, a scheduler for an eNB and a gNB utilizes dynamic spectrum sharing to allocate RAN resources (e.g., physical resource blocks (PRBs) and a transmission time interval (TTI)) based on an incoming traffic load received by the scheduler. For example, if the incoming traffic includes 20% 4G traffic and 80% 5G traffic, the scheduler will target RAN resource allocation in the same ratio (e.g., 20% of the RAN resources will be allocated to the 4G traffic and 80% of the RAN resources will be allocated to the 5G traffic). Unfortunately, such a technique fails to enable tuning of the RAN resource allocation based on 5G core network features (e.g., network slices). Thus, existing techniques inefficiently utilize and waste computing resources (e.g., processing resources, memory resources, communication resources, and/or the like), networking resources, and/or the like by incorrectly allocating 4G traffic and 5G traffic.

Some implementations described herein provide a device of a RAN (e.g., an eNB and/or a gNB (eNB/gNB)) of the RAN) that provides closed looped tuning of dynamic spectrum sharing in networks. For example, the eNB/gNB may receive first traffic associated with a first network type service, second traffic associated with a second network type service, and core network data associated with a core network that provides the first network type service and the second network type service. The eNB/gNB may calculate a per quality of service class identifier (QCI) or 5G quality of service flow identifier (QFI) split for the first traffic and the second traffic based on the core network data, and may calculate an initial resource split for the first traffic and the second traffic based on the per QCI split. The eNB/gNB may provide, to a first device, data identifying the initial resource split, and may receive a traffic bias per QCI for the first traffic and the second traffic based on providing the data identifying the initial resource split to the first device. The eNB/gNB may calculate a final resource split for the first traffic and the second traffic based on the traffic bias per QCI, and may cause the final resource split for the first traffic and the second traffic to be implemented via resources associated with the radio access network.

In this way, the eNB/gNB of the RAN provides closed looped tuning of dynamic spectrum sharing in networks. The eNB/gNB utilizes a first loop to determine spectrum allocation of RAN resources based on instantaneous traffic patterns near to the eNB/gNB. The eNB/gNB utilizes a second loop to adjust the spectrum allocation of the RAN resources based on core network data (e.g., network slice data), to adapt to weights assigned by the core network for different technologies, and to tune user experience levels for 4G and 5G traffic based on a 4G and 5G pricing framework. Thus, the eNB/gNB conserves computing resources, networking resources, and/or the like that would otherwise be inefficiently utilized and wasted by incorrectly allocating 4G traffic and 5G traffic.

FIGS. 1A-1F are diagrams of one or more example implementations 100 described herein. As shown in FIG. 1A, a user equipment 105 (e.g., a mobile phone, a computer, and/or the like) may be associated with a radio access network (RAN) 110 and a core network 115. RAN 110 may include one or more eNBs/gNBs that provide closed looped tuning of dynamic spectrum sharing in RAN 110. Core network 115 may include an example architecture of a 4G core network, a 5G NR core network included in a 5G wireless telecommunications system, and/or the like.

As further shown in FIG. 1A, and by reference number 120, RAN 110 may receive, from a first UE 105, first traffic associated with a 4G service. In some implementations, the first traffic may include 4G LTE traffic, traffic that requires utilization of 4G resources, and/or the like. As further shown in FIG. 1A, and by reference number 125, RAN 110 may receive, from a second UE 105, second traffic associated with a 5G service. In some implementations, the second traffic may include 5G NR traffic, traffic that requires utilization of 5G resources, and/or the like. The first traffic and the second traffic may utilize a same radio frequency spectrum or share a same radio frequency resource.

Figure 1B:
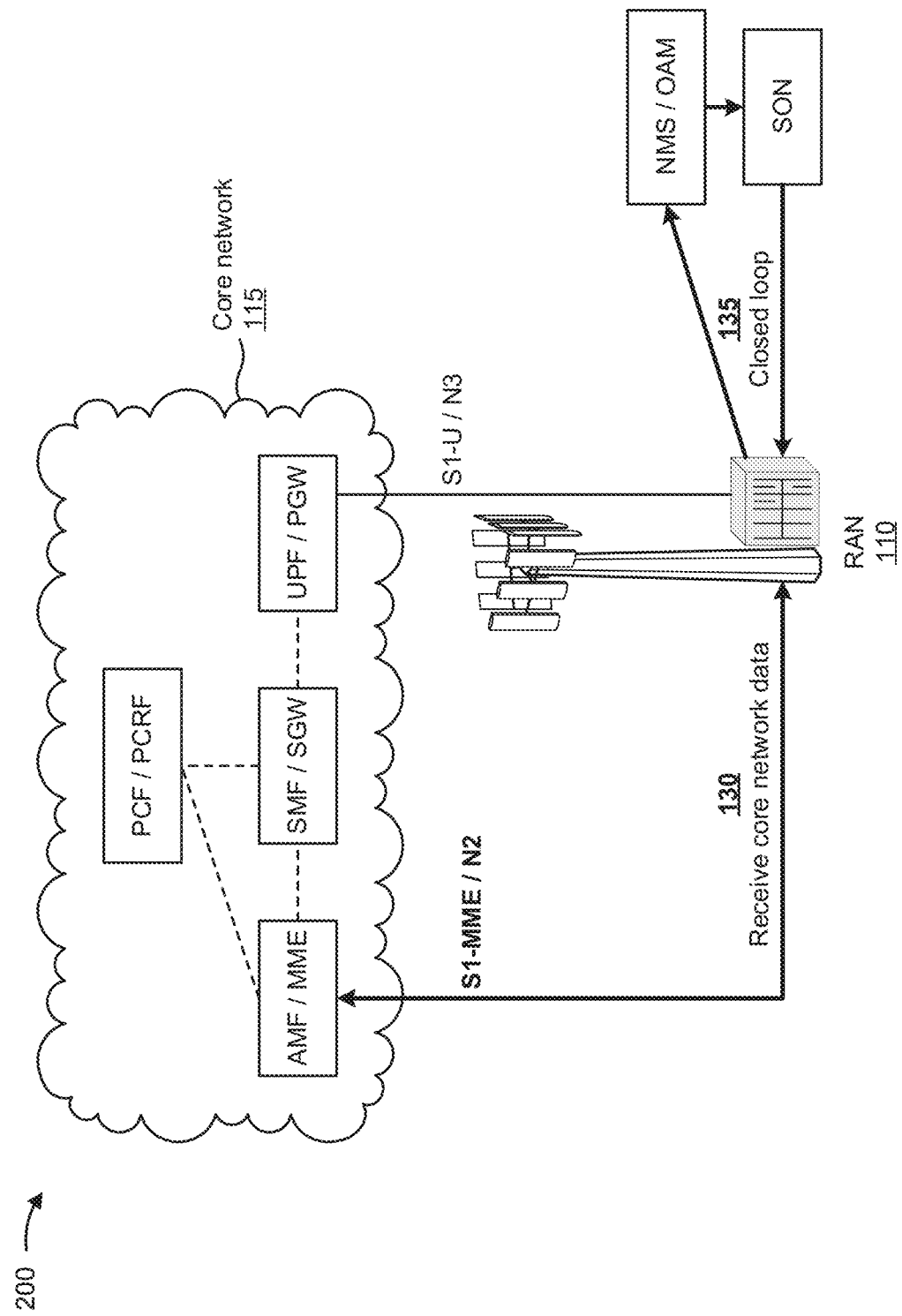

As shown in FIG. 1B, and by reference number 130, RAN 110 may receive core network data from core network 115. In some implementations, core network 115 may include a policy control function (PCF)/policy and charging rules function (PCRF) that provides a policy framework that incorporates network slicing, roaming, packet processing, mobility management, and/or the like; an access and mobility management function (AMF)/mobility management entity (MME) that provides a termination point for non-access stratum (NAS) signaling, mobility management, and/or the like; a session management function (SMF)/serving gateway (SGW) that supports the establishment, modification, and release of communications sessions in a wireless telecommunications system; and a user plane function (UPF)/packet data network gateway (PGW) that provides an anchor point for intraRAT and/or interRAT mobility. In some implementations, core network 115 may include additional elements, as described below in connection with FIG. 2.

As further shown in FIG. 1B, RAN 110 may communicate with the AMF/MME via an S1-MME/N2 interface that may be established between RAN 110 and the AMF/MME. The S1-MME/N2 interface may enable the AMF/MME to provide the core network data to RAN 110, and may enable RAN 110 to request the core network data from the AMF/MME. RAN 110 may communicate with the UPF/PGW via an S1-U/N3 interface.

In some implementations, the core network data may include data identifying one or more network slices associated with core network 115, a weight assigned to the 4G service, a weight assigned to the 5G service, a price associated with the 4G service, a price associated with the 5G service, and/or the like. The network slices may enable multiple virtual networks to be created on top of a shared common physical infrastructure so that operators can provide functionality specific to particular services or particular types of customers over the common network infrastructure. In some implementations, the weights may be assigned by core network 115, to the 4G service and the 5G service, based on different technologies (e.g., 4G technologies and/or 5G technologies). In some implementations, the prices may be assigned based on different user experiences (e.g., by UEs 105) associated with a 4G pricing framework and/or a 5G pricing framework. For example, prices for 5G services may be greater than prices for 4G services since the 5G services may provide better user experiences than the 4G services.

As further shown in FIG. 1B, and by reference number 135, RAN 110 may communicate with a network management system (NMS)/operations, administration and management (OAM) device and a self-organizing network (SON) device to form a closed communication loop, as described below. The NMS/OAM device may manage, monitor, administer, and/or maintain components of RAN 110. For example, the NMS/OAM device may calculate performance indicators, such as latency, jitter, packet loss, utilization, throughput, data volume, user speeds, and/or the like based on an initial resource split for the first traffic and the second traffic. The SON device may plan for, configure, manage, optimize, and/or repair components of RAN 110. For example, the SON device may calculate a traffic bias for the first traffic and the second traffic based on the performance indicators that are calculated by the NMS/OAM device.

Figure 1C:
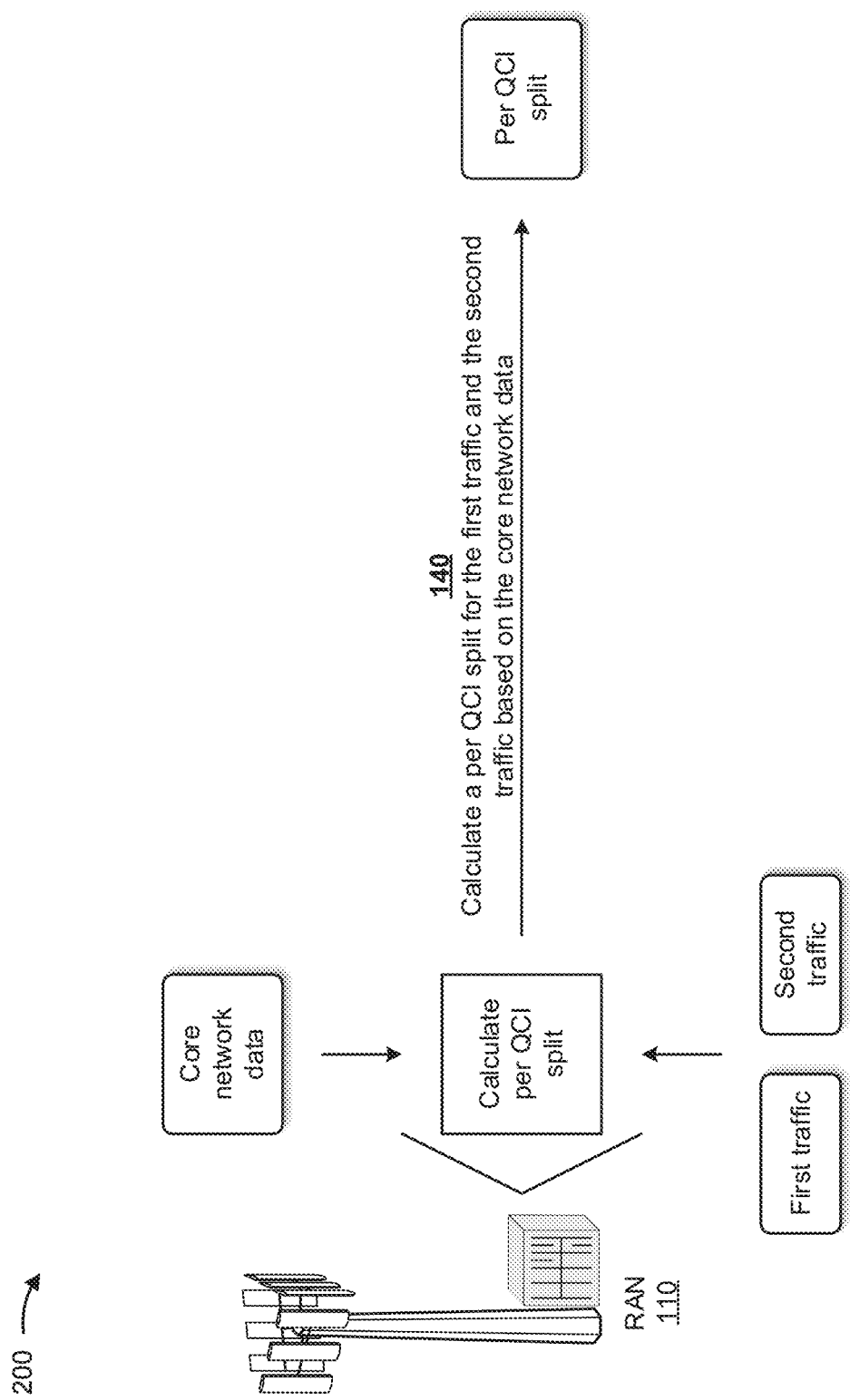

As shown in FIG. 1C, and by reference number 140, RAN 110 may calculate a per quality of service class identifier (QCI) split for the first traffic and the second traffic based on the core network data. In some implementations, RAN 110 may calculate a per QCI split for the first traffic and the second traffic based on the data identifying the one or more network slices provided in the core network data. For example, if a network slice indicates that forty percent of the resources of RAN 110 should be allocated for the first traffic and sixty percent of the resources of RAN 110 should be allocated for the second traffic, RAN 110 may determine a forty-to-sixty per QCI split for the first traffic and the second traffic. In some implementations, the per QCI split may be based on a QCI associated with the first traffic and the second traffic. A QCI may be associated with a quality of packet communication (e.g., packet forwarding treatment) for a bearer channel associated with a particular type and purpose of communication. A QCI may ensure that bearer traffic is allocated an appropriate quality of service (QoS). Furthermore, different bearer traffic may require different QoS and therefore different QCI values.

Figure 1D:
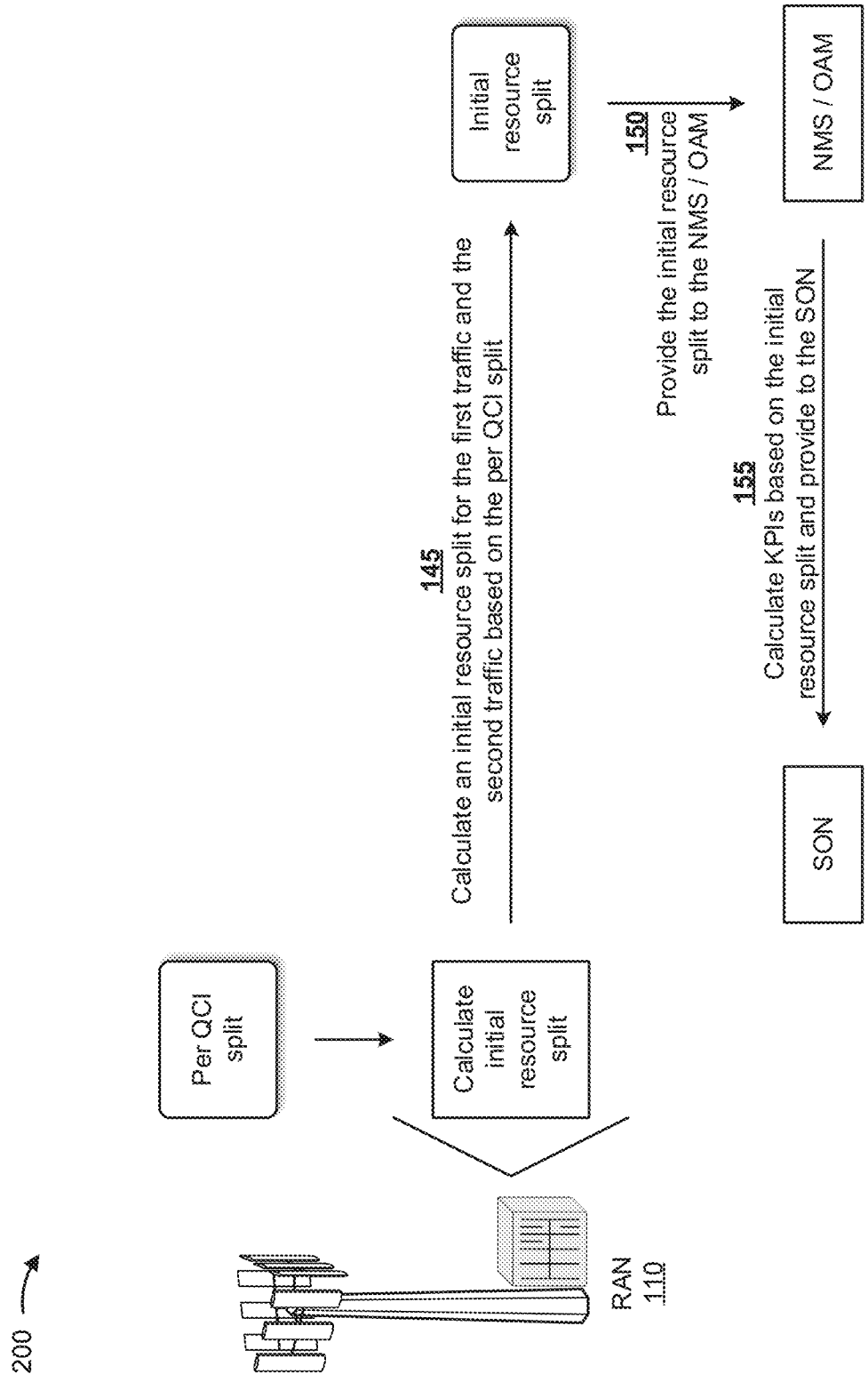

As shown in FIG. 1D, and by reference number 145, RAN 110 may calculate an initial resource split for the first traffic and the second traffic based on the per QCI split. In some implementations, the initial resource split may include an initial determination of a first percentage of resources of RAN 110 that are to be allocated to the first traffic and a second percentage of the resources of RAN 110 that are to be allocated to the second traffic. For example, a thirty-to-seventy initial resource split for the first traffic and the second traffic may indicate thirty percent of the resources of RAN 110 are to be allocated to the first traffic and seventy percent of the resources of RAN 110 are to be allocated to the second traffic.

As further shown in FIG. 1D, and by reference number 150, RAN 110 may provide data identifying the initial resource split to the NMS/OAM device. The NSM/OAM device may receive the data identifying the initial resource split, and receipt of the data identifying the initial resource split may cause the NSM/OAM device to perform one or more actions.

For example, as further shown in FIG. 1D, and by reference number 155, NMS/OAM may calculate key performance indicators (KPIs) based on the initial resource split, and may provide the KPIs to the SON device. In some implementations, the KPIs may be associated with resources of RAN 110. For example, the KPIs may include a latency associated with the resources of RAN 110, a jitter associated with the resources of RAN 110, a packet loss associated with the resources of RAN 110, utilization associated with the resources of RAN 110, a throughput associated with the resources of RAN 110, a quality of service associated with the resources of RAN 110, and/or the like. In some implementations, the SON device may receive the KPIs from the NSM/OAM device, and receipt of the KPIs may cause the SON device to perform one or more actions. For example, the SON device may calculate, based on the KPIs, a traffic bias per QCI for the first traffic and the second traffic, as described below.

Figure 1E:
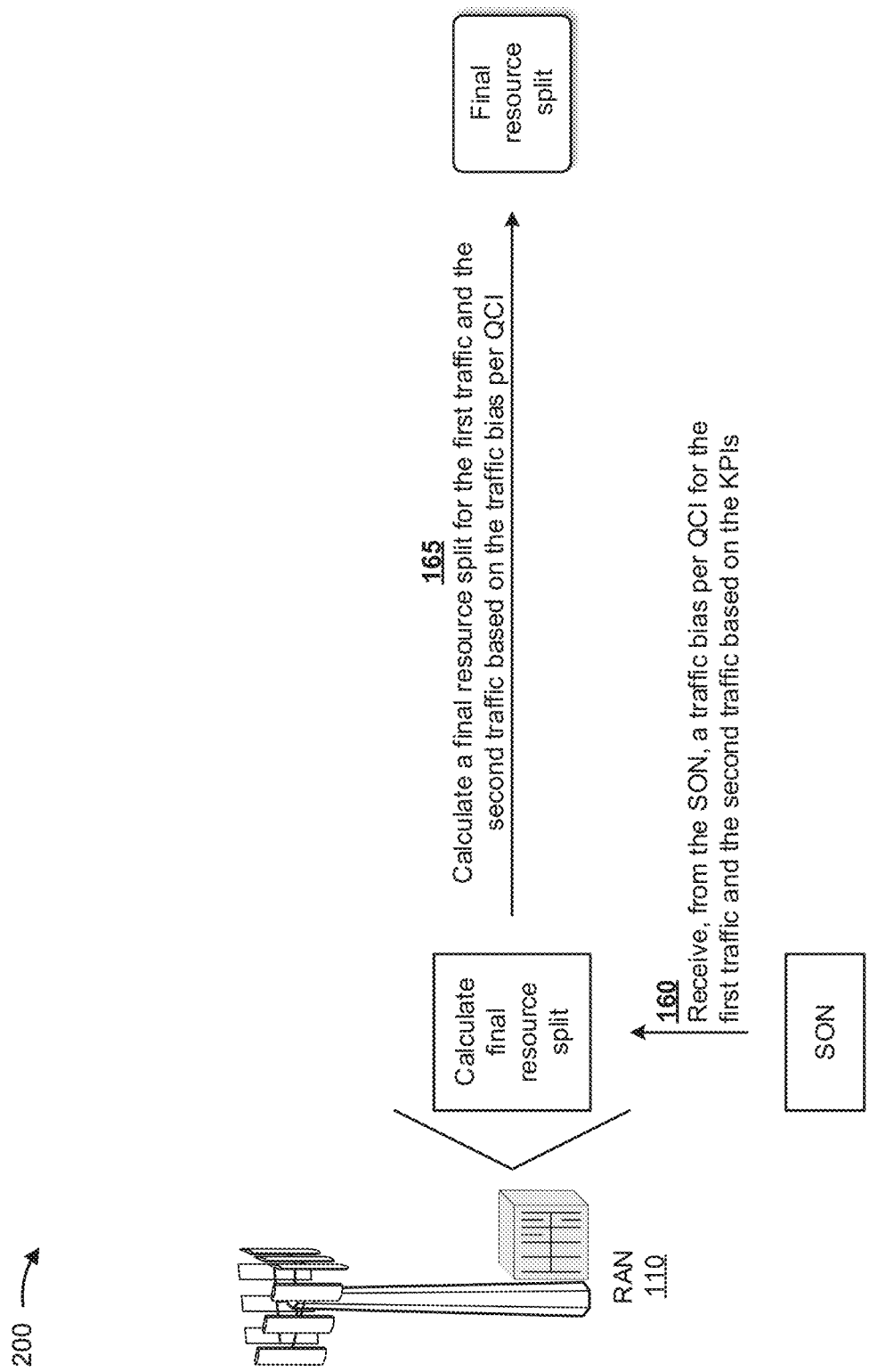

As shown in FIG. 1E, and by reference number 160, RAN 110 may receive, from the SON device, the traffic bias per QCI for the first traffic and the second traffic. In some implementations, the SON device may calculate the traffic bias per QCI for the first traffic and the second traffic based on a first forward data volume (FDV) associated with the first traffic (e.g., FDV_LTE), a second forward data volume associated with the second traffic (e.g., FDV_NR), a first average schedule of eligible users (ASEU) per transmission time interval (TTI) associated with the first traffic (e.g., ASEU_LTE), and a second average schedule of eligible users per TTI associated with the second traffic (e.g., ASEU_NR). For example, the SON device may calculate, at time T-1, the traffic bias (e.g., an LTE/NR Bias') as follows:

$$\text{LTE/NR Bias}^{T-1} = (\text{FDV\_LTE}^{T-1}/\text{ASEU\_LTE}^{T-1}) * (\text{ASEU\_NR}^{T-1}/\text{FDV\_NR}^{T-1})$$

and may calculate, at time T, the traffic bias (e.g., an LTE/NR Bias$^T$) as follows:

$$\text{LTE/NR Bias}^T = (\text{FDV\_LTE}^T/\text{FDV\_NR}^T) * (1/\text{LTE/NR Bias}^{T-1}),$$

where T may correspond to any interval of time (e.g., one minute, fifteen minutes, one hour, and/or the like), FDV may correspond to forward data volume, and ASEU may correspond to average scheduler eligible users per TTI.

As further shown in FIG. 1E, and by reference number 165, RAN 110 may calculate a final resource split for the first traffic and the second traffic based on the traffic bias per QCI for the first traffic and the second traffic. In some implementations, the final resource split may include a final determination of a first percentage of the resources of RAN 110 that are to be allocated to the first traffic and a second percentage of the resources of RAN 110 that are to be allocated to the second traffic. For example, if the final resource split indicates a twenty-to-eighty traffic resource split for the first traffic and the second traffic, RAN 110 may cause twenty percent of the resources of RAN 110 to be allocated to the first traffic and may cause eighty percent of the resources of RAN 110 to be allocated to the second traffic.

Figure 1F:
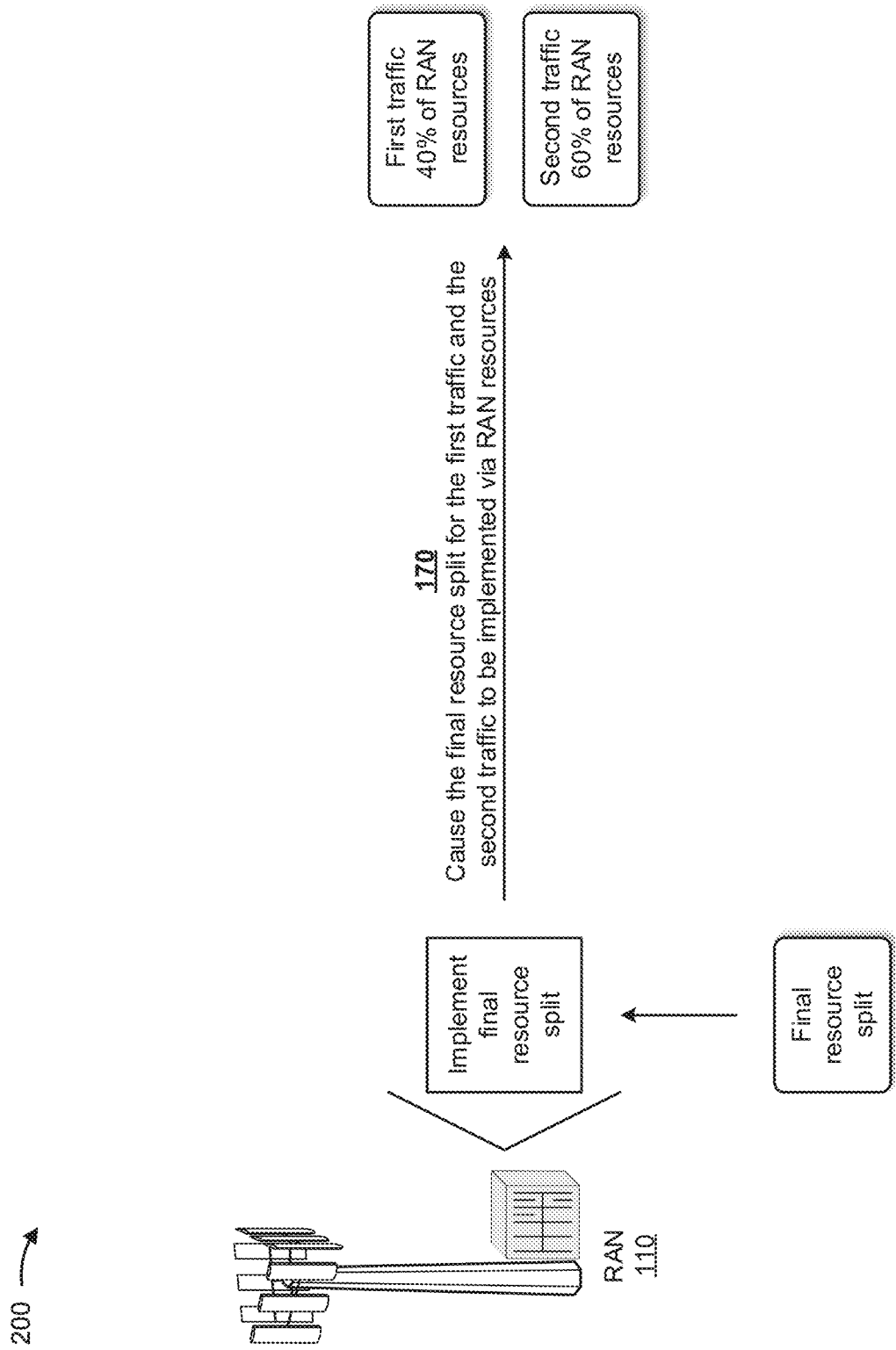

As shown in FIG. 1F, and by reference number 170, RAN 110 may cause the final resource split for the first traffic and the second traffic to be implemented via the resources of RAN 110. For example, if the final resource split indicates that forty percent of the resources of RAN 110 are to be allocated to the first traffic and that sixty percent of the resources of RAN 110 are to be allocated to the second traffic, RAN 110 may cause forty percent of the resources of RAN 110 to be allocated to the first traffic and may cause sixty percent of the resources of RAN 110 to be allocated to the second traffic.

In some implementations, prior to calculating the final resource split (e.g., described with respect to reference number 165 above), RAN 110 may calculate another initial resource split for the first traffic and the second traffic based on the traffic bias per QCI for the first traffic and the second traffic. In this case, RAN 110 may provide, to the NMS/OAM device, data identifying the other initial resource split, and the NMS/OAM device may calculate other KPIs based on the other initial resource split. The NMS/OAM device may provide the other KPIs to the SON device, and the SON device may calculate another traffic bias per QCI for the first traffic and the second traffic based on the other KPIs. The SON device may provide the other traffic bias per QCI to RAN 110.

RAN 110 may receive the other traffic bias per QCI for the first traffic and the second traffic from the SON device. In some implementations, RAN 110 may calculate another final resource split for the first traffic and the second traffic based on the other traffic bias per QCI, and may cause the other final resource split for the first traffic and the second traffic, rather than the final resource split, to be implemented via the resources of RAN 110.

In some implementations, RAN 110 may repeat the process described above with respect to reference numbers 145-160 any quantity of times (e.g., may perform the process N times), before calculating a final resource split, as described above with respect to reference number 165. In this way, a more accurate final resource split may be determined. In some implementations, the quantity (N) may be configurable (e.g., selectable, adjustable based on a default, and/or the like) based on particular efficiency objectives of RAN 110, accuracy objectives of RAN 110, priorities of RAN 110, and/or the like.

In some implementations, when causing the final resource split for the first traffic and the second traffic to be implemented, RAN 110 may cause the final resource split for the first traffic and the second traffic to be implemented via the resources of RAN 110 and based on dynamic spectrum sharing. As explained above, dynamic spectrum sharing in a RAN (e.g., RAN 110) enables use of a same block of spectrum for 4G resources and 5G resources. Although implementations described herein are described in connection with providing a closed communication loop between RAN 110, the NMS/OAM device, and the SON device, in some implementations, RAN 110 may perform one or more of the functions described above as being performed by the NMS/OAM device or the SON device.

In this way, RAN 110 may provide closed looped tuning of dynamic spectrum sharing in RAN 110. RAN 110 may determine spectrum allocation of RAN 110 resources based on instantaneous traffic patterns near RAN 110, and may adjust the spectrum allocation of RAN 110 resources based on data from core network 115. For example, RAN 110 may adapt to weights assigned by core network 115 for different technologies, and may tune user experience levels of UEs 105 for 4G and 5G traffic based on a 4G and 5G pricing framework. Thus, RAN 110 conserves computing resources, networking resources, and/or the like that would otherwise be inefficiently utilized and wasted by incorrectly allocating 4G traffic and 5G traffic.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
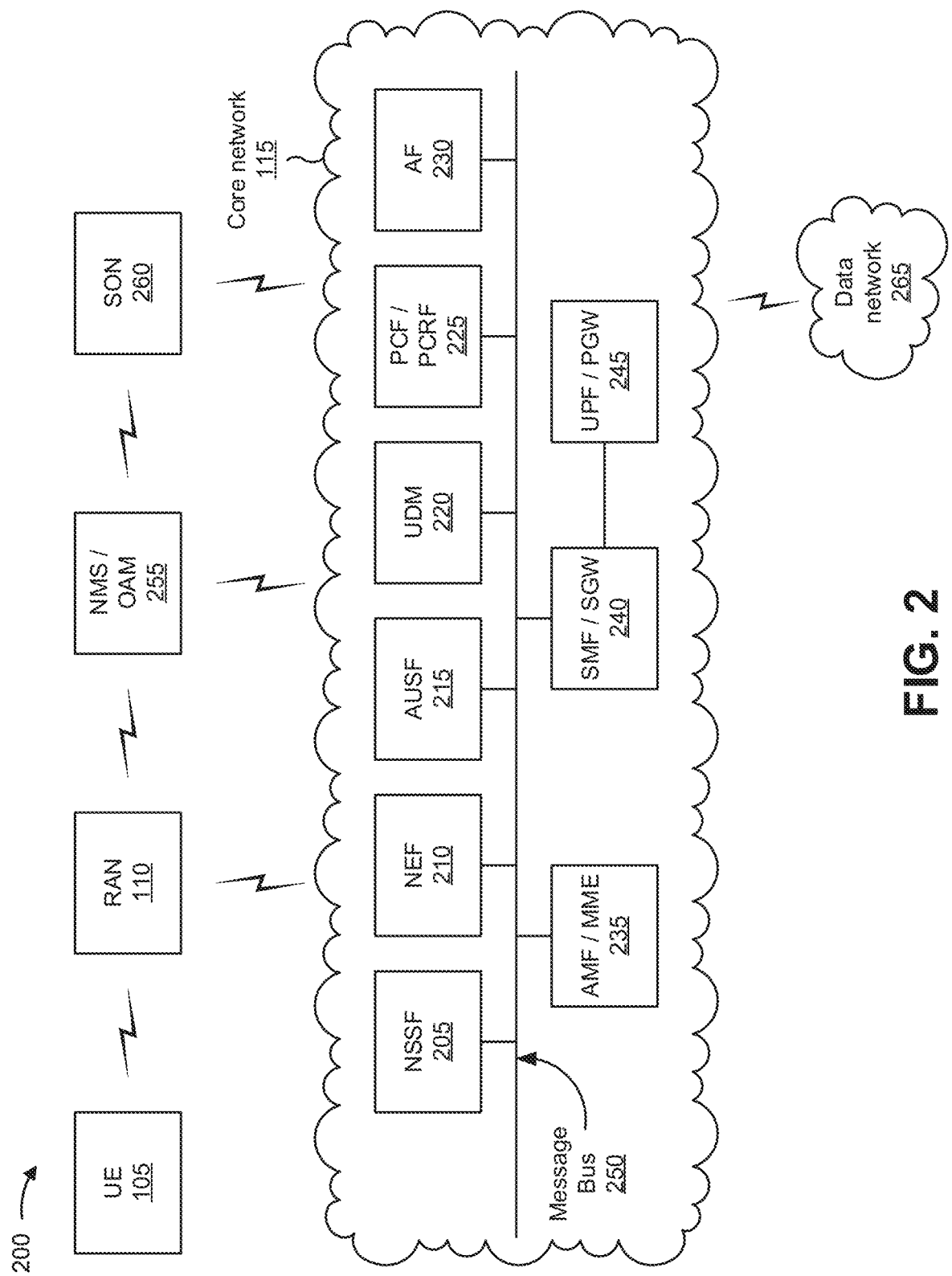
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, a network management system (NMS)/operations, administration and management (OAM) device 255, a self-organizing network (SON) device 260, and a data network 265. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment 105. RAN 110 may transfer traffic between user equipment 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF)/policy and charging rules function (PCRF) 225, an application function (AF) 230, an access and mobility management function (AMF)/mobility management entity (MME) 235, a session management function (SMF)/serving gateway (SGW) 240, a user plane function (UPF)/packet data network gateway (PGW) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user equipment 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user equipment 105 in the wireless telecommunications system.

UDM 220 includes one or more devices that store user data and profiles in the wireless telecommunications system. UDM 220 may be used for fixed access, mobile access, and/or the like, in core network 115.

PCF/PCRF 225 includes one or more devices that provide a policy framework that incorporates network slicing, roaming, packet processing, mobility management, and/or the like. PCF/PCRF 225 includes one or more devices that aggregate information to and from core network 115, operational support systems, other sources, and/or the like in real time; support creation of rules; automatically make policy decisions for each subscriber active on core network 115, and/or the like.

AF 230 includes one or more devices that support application influence on traffic routing, access to NEF 210, policy control, and/or the like.

AMF/MME 235 includes one or more devices that act as a termination point for non-access stratum (NAS) signaling, mobility management, and/or the like. AMF/MME 235 includes one or more devices that manage authentication, activation, deactivation, and/or mobility functions associated with user equipment 105; facilitate selection of a particular SMF/SGW 240 and/or a particular UPF/PGW 245 to serve traffic to and/or from user equipment 105, and/or the like.

SMF/SGW 240 includes one or more devices that support the establishment, modification, and release of communication sessions in the wireless telecommunications system. For example, SMF/SGW 240 may configure traffic steering policies at UPF/PGW 245, enforce user equipment IP address allocation and policies, and/or the like. SMF/SGW 240 includes one or more devices that aggregate traffic received from RAN 110 and send the aggregated traffic to data network 265 (e.g., via UPF/PGW 245).

UPF/PGW 245 includes one or more devices that serve as an anchor point for intraRAT and/or interRAT mobility. UPF/PGW 245 may apply rules to packets, such as rules pertaining to packet routing, traffic reporting, handling user plane QoS, and/or the like. UPF/PGW 245 includes one or more devices that provide connectivity for user equipment 105 to external packet data networks, such as data network 265.

Message bus 250 represents a communication structure for communication among the functional elements. In other words, message bus 250 may permit communication between two or more functional elements.

NMS/OAM device 255 includes one or more devices that manage components of RAN 110, monitor both software and hardware components of RAN 110, operate on and administer the components of RAN 110, maintain the components of RAN 110, and/or the like.

SON device 260 includes one or more devices that plan for, configure, manage, optimize, repair, and/or the like components of RAN 110.

Data network 265 includes one or more wired and/or wireless data networks. For example, data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
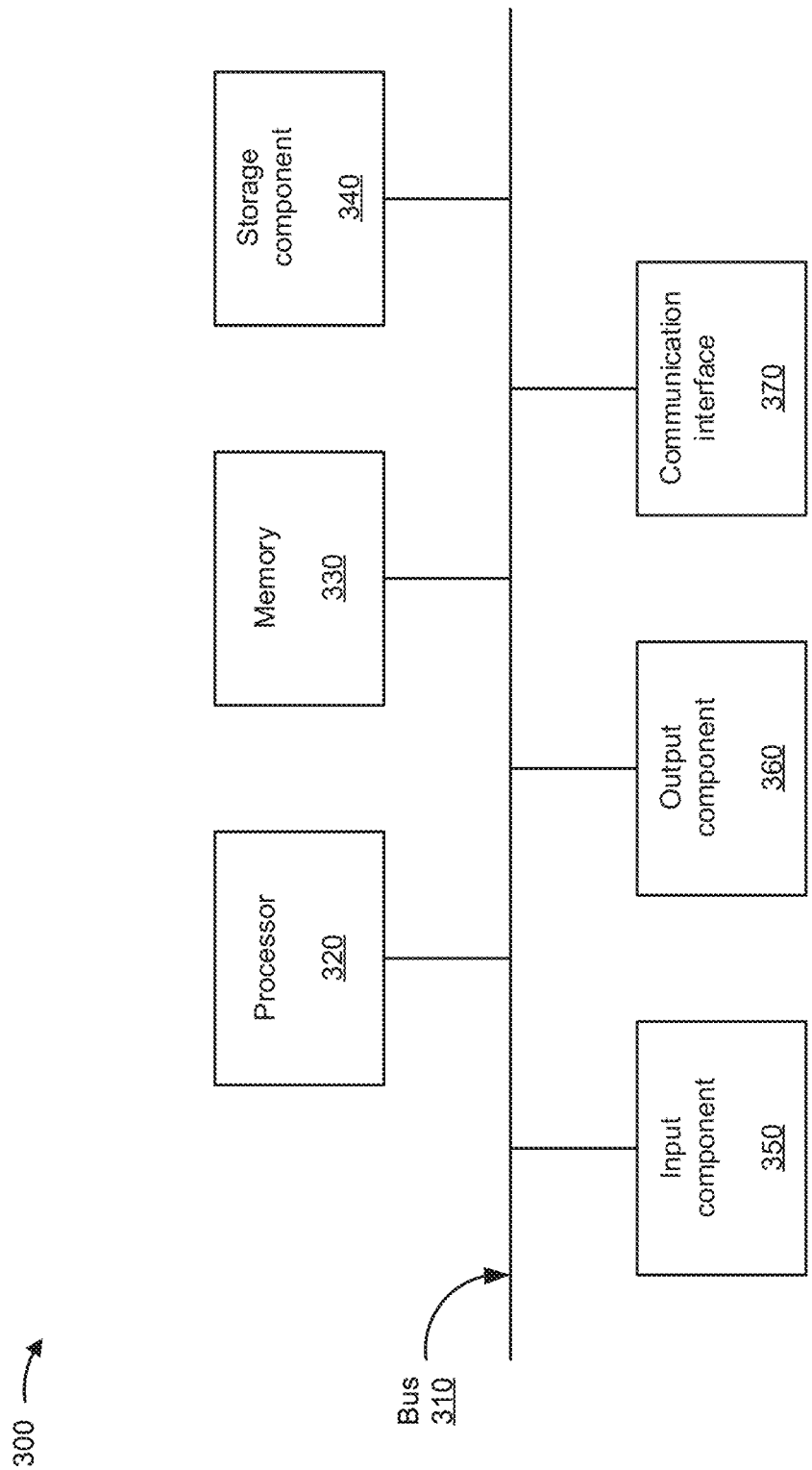
FIG. 3 is a diagram of example components of one or more devices of FIG. 2.

FIG. 3 is a diagram of example components of a device 300. Device 300 may correspond to user equipment 105, NSSF 205, NEF 210, AUSF 215, UDM 220, PCF/PCRF 225, AF 230, AMF/MME 235, SMF/SGW 240, UPF/PGW 245, NMS/OAM 255, and/or SON 260. In some implementations, user equipment 105, NSSF 205, NEF 210, AUSF 215, UDM 220, PCF/PCRF 225, AF 230, AMF/MME 235, SMF/SGW 240, UPF/PGW 245, NMS/OAM 255, and/or SON 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
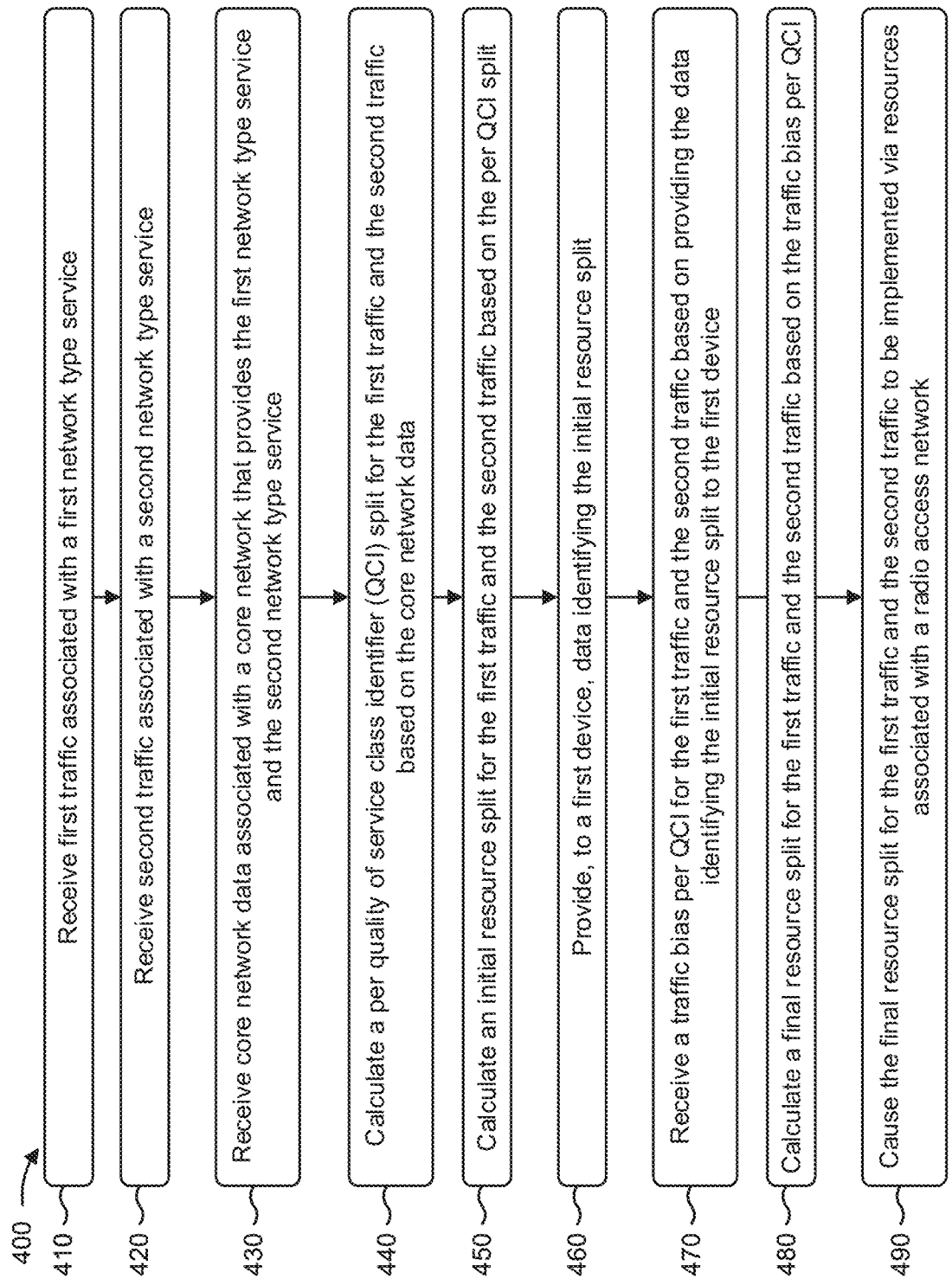
FIG. 4 is a flow chart of an example process for closed looped tuning of dynamic spectrum sharing in networks.

FIG. 4 is a flow chart of an example process 400 for closed looped tuning of dynamic spectrum sharing in networks. In some implementations, one or more process blocks of FIG. 4 may be performed by a device (e.g., a device of RAN 110, such as an eNB/gNB). In some implementations, one or more process blocks of FIG. 4 may be performed by another device or a group of devices separate from or including the device, such as an NMS/OAM (e.g., NMS/OAM 255) and/or a SON (e.g., SON 260).

As shown in FIG. 4, process 400 may include receiving first traffic associated with a first network type service (block 410). For example, the device (e.g., using processor 320, communication interface 370, and/or the like) may receive first traffic associated with a first network type service, as described above. The first traffic may be received from a first user equipment, and the first network type service may include a 4G network service.

As further shown in FIG. 4, process 400 may include receiving second traffic associated with a second network type service (block 420). For example, the device (e.g., using processor 320, memory 330, communication interface 370, and/or the like) may receive second traffic associated with a second network type service, as described above. The second traffic may be received from a second user equipment that is different than the first user equipment, and the second network type service may include a 5G NR network service.

As further shown in FIG. 4, process 400 may include receiving core network data associated with a core network that provides the first network type service and the second network type service (block 430). For example, the device (e.g., using processor 320, storage component 340, communication interface 370, and/or the like) may receive core network data associated with a core network that provides the first network type service and the second network type service, as described above. The core network data may include data identifying one or more network slices associated with the core network, weights assigned to the first network type service and the second network type service, prices associated with the first network type service and the second network type service, and/or the like.

As further shown in FIG. 4, process 400 may include calculating a per quality of service class identifier (QCI) split for the first traffic and the second traffic based on the core network data (block 440). For example, the device (e.g., using processor 320, memory 330, and/or the like) may calculate a per quality of service class identifier (QCI) split for the first traffic and the second traffic based on the core network data, as described above.

As further shown in FIG. 4, process 400 may include calculating an initial resource split for the first traffic and the second traffic based on the per QCI split (block 450). For example, the device (e.g., using processor 320, storage component 340, and/or the like) may calculate an initial resource split for the first traffic and the second traffic based on the per QCI split, as described above.

As further shown in FIG. 4, process 400 may include providing, to a first device, data identifying the initial resource split (block 460). For example, the device (e.g., using processor 320, memory 330, communication interface 370, and/or the like) may provide, to a first device, data identifying the initial resource split, as described above. The data identifying the initial resource split may cause the first device to calculate key performance indicators for the resources associated with the radio access network based on the data identifying the initial resource split, and to provide the key performance indicators to a second device. The key performance indicators may cause the second device to calculate the traffic bias per QCI for the first traffic and the second traffic, and to provide the traffic bias per QCI to the device. In some implementations, the key performance indicators may include a latency, a jitter, a packet loss, a utilization, a throughput, and/or a quality of service associated with the resources associated with the radio access network. In some implementations, the first device may include a network management system/operations, administration and management (NMS/OAM) device, and the second device may include a self-organizing network (SON) device.

As further shown in FIG. 4, process 400 may include receiving a traffic bias per QCI for the first traffic and the second traffic based on providing the data identifying the initial resource split to the first device (block 470). For example, the device (e.g., using processor 320, communication interface 370, and/or the like) may receive a traffic bias per QCI for the first traffic and the second traffic based on providing the data identifying the initial resource split to the first device, as described above. In some implementations, the traffic bias per QCI for the first traffic and the second traffic may be calculated based on a first forward data volume associated with the first traffic, a second forward data volume associated with the second traffic, a first average schedule of eligible users per transmission time interval associated with the first traffic, and a second average schedule of eligible users per transmission time interval associated with the second traffic.

As further shown in FIG. 4, process 400 may include calculating a final resource split for the first traffic and the second traffic based on the traffic bias per QCI (block 480). For example, the device (e.g., using processor 320, storage component 340, and/or the like) may calculate a final resource split for the first traffic and the second traffic based on the traffic bias per QCI, as described above.

As further shown in FIG. 4, process 400 may include causing the final resource split for the first traffic and the second traffic to be implemented via resources associated with a radio access network (block 490). For example, the device (e.g., using processor 320, memory 330, storage component 340, communication interface 370, and/or the like) may cause the final resource split for the first traffic and the second traffic to be implemented via resources associated with a radio access network, as described above. The resources associated with the radio access network may include physical resource blocks and a transmission time interval associated with the radio access network. In some implementations, causing the final resource split for the first traffic and the second traffic to be implemented via the resources associated with the radio access network may include causing the final resource split for the first traffic and the second traffic to be implemented via the resources associated with the radio access network and based on dynamic spectrum sharing.

Process 400 may include additional implementations, such as any single implementation or any combination of implementations described below and/or in connection with one or more other processes described elsewhere herein.

In some implementations, process 400 may include calculating, prior to calculating the final resource split, another initial resource split for the first traffic and the second traffic based on the traffic bias per QCI for the first traffic and the second traffic; providing, to the first device, data identifying the other initial resource split; and receiving another traffic bias per QCI for the first traffic and the second traffic based on providing the data identifying the other initial resource split to the first device.

In some implementations, process 400 may include calculating another final resource split for the first traffic and the second traffic based on the other traffic bias per QCI; and causing the other final resource split for the first traffic and the second traffic, rather than the final resource split, to be implemented via the resources associated with the radio access network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   calculating, by a device, a per quality of service class identifier (QCI) split for first traffic associated with a first network type service and second traffic associated with a second network type service based on core network data,
      the core network data associated with a core network that provides the first network type service and the second network type service;
   receiving, by the device, a traffic bias per QCI for the first traffic and the second traffic based on the per QCI split and key performance indicators for resources associated with a radio access network; and
   causing, by the device, a final resource split for the first traffic and the second traffic to be implemented via the resources associated with the radio access network based on the traffic bias per QCI.

2. The method of claim 1, further comprising:
   receiving the first traffic associated with the first network type service;
   receiving the second traffic associated with the second network type service; and
   receiving the core network data associated with the core network.

3. The method of claim 1, further comprising:
   calculating an initial resource split for the first traffic and the second traffic based on the per QCI split;
   providing data identifying the initial resource split; and
   wherein receiving the traffic bias per QCI for the first traffic and the second traffic comprises:
      receiving the traffic bias per QCI for the first traffic and the second traffic based on providing the data identifying the initial resource split.

4. The method of claim 1, further comprising:
   causing a first device to calculate the key performance indicators based on data identifying an initial resource split, and to provide the key performance indicators to a second device,
      wherein the key performance indicators cause the second device to calculate the traffic bias per QCI for the first traffic and the second traffic, and to provide the traffic bias per QCI to the device.

5. The method of claim 1, wherein the traffic bias per QCI for the first traffic and the second traffic is calculated based on:
   a first forward data volume associated with the first traffic,
   a second forward data volume associated with the second traffic,
   a first average schedule of eligible users per transmission time interval associated with the first traffic, and
   a second average schedule of eligible users per transmission time interval associated with the second traffic.

6. The method of claim 1, wherein the final resource split includes a final determination of a first percentage of the resources that are to be allocated to the first traffic and a second percentage of the resources that are to be allocated to the second traffic.

7. The method of claim 1, wherein the core network includes a policy control function policy and charging rules function.

8. A device, comprising:
   one or more processors configured to:
      calculate a per quality of service class identifier (QCI) split for first traffic associated with a first network type service and second traffic associated with a second network type service based on a core network data,
         the core network data associated with a core network that provides the first network type service and the second network type service;
      receive a traffic bias per QCI for the first traffic and the second traffic based on the per QCI split and key performance indicators for resources associated with a radio access network; and
      cause a final resource split for the first traffic and the second traffic to be implemented via the resources associated with the radio access network based on the traffic bias per QCI.

9. The device of claim 8, wherein the final resource split includes a final determination of a first percentage of the resources that are to be allocated to the first traffic and a second percentage of the resources that are to be allocated to the second traffic.

10. The device of claim 8, wherein the one or more processors, when causing the final resource split, are to:
    cause the final resource split for the first traffic and the second traffic to be implemented via the resources associated with the radio access network and based on dynamic spectrum sharing.

11. The device of claim 7, wherein the key performance indicators are one or more of:
    a latency identifier associated with the resources associated with the radio access network,
    a jitter identifier associated with the resources associated with the radio access network,
    a packet loss identifier associated with the resources associated with the radio access network,
    utilization identifier associated with the resources associated with the radio access network, a throughput identifier associated with the resources associated with the radio access network, or a quality of service identifier associated with the resources associated with the radio access network.

12. The device of claim 7, wherein the one or more processors, are further configured to:
cause a first device to calculate the key performance indicators based on data identifying an initial resource split, and to provide the key performance indicators to a second device,
wherein the key performance indicators cause the second device to calculate the traffic bias per QCI for the first traffic and the second traffic, and to provide the traffic bias per QCI to the device.

13. The device of claim 7, wherein the core network data includes data identifying one or more of:
one or more network slices associated with the core network,
weights assigned to the first network type service and the second network type service, or
prices associated with the first network type service and the second network type service.

14. The device of claim 7, wherein the one or more processors, when causing the final resource split for the first traffic and the second traffic to be implemented via the resources associated with the radio access network, are to:
cause the final resource split for the first traffic and the second traffic to be implemented via the resources associated with the radio access network and based on dynamic spectrum sharing.

15. A non-transitory computer-readable medium storing instructions, the instructions comprising:
one or more instructions that, when executed by one or more processors of a device, cause the one or more processors to:
receive core network data associated with a core network that provides a first network type service and a second network type service;
calculate a per quality of service class identifier (QCI) split for first traffic associated with the first network type service and second traffic associated with the second network type service based on the core network data;
receive a traffic bias per QCI for the first traffic and the second traffic based on the per QCI split and key performance indicators for resources associated with a radio access network; and
cause a final resource split for the first traffic and the second traffic to be implemented via the resources associated with the radio access network based on the traffic bias per QCI.

16. The non-transitory computer-readable medium of claim 15, wherein the instructions further include:
one or more instructions that cause the one or more processors to cause a first device to calculate the key performance indicators based on data identifying an initial resource split, and to provide the key performance indicators to a second device,
wherein the key performance indicators cause the second device to calculate the traffic bias per QCI for the first traffic and the second traffic, and to provide the traffic bias per QCI to the device.

17. The non-transitory computer-readable medium of claim 16, wherein the traffic bias per QCI for the first traffic and the second traffic is calculated based on:
a first forward data volume associated with the first traffic,
a second forward data volume associated with the second traffic,
a first average schedule of eligible users per transmission time interval associated with the first traffic, and
a second average schedule of eligible users per transmission time interval associated with the second traffic.

18. The non-transitory computer-readable medium of claim 15, wherein the instructions that cause the one or more processors to cause the final resource split, cause the one or more processors to:
cause the final resource split for the first traffic and the second traffic to be implemented via the resources associated with the radio access network and based on dynamic spectrum sharing.

19. The non-transitory computer-readable medium of claim 15, wherein the final resource split includes a final determination of a first percentage of the resources that are to be allocated to the first traffic and a second percentage of the resources that are to be allocated to the second traffic.

20. The non-transitory computer-readable medium of claim 15, wherein the instructions further include:
one or more instructions that cause the one or more processors to:
calculate an initial resource split for the first traffic and the second traffic based on the per QCI split;
provide data identifying the initial resource split; and
wherein the one or more instructions, that cause the one or more processors to receive the traffic bias per QCI for the first traffic and the second traffic, cause the one or more processors to:
receive the traffic bias per QCI for the first traffic and the second traffic based on providing the data identifying the initial resource split.

\* \* \* \* \*